United States Patent
Takahashi

(10) Patent No.: US 10,295,022 B2
(45) Date of Patent: May 21, 2019

(54) MULTISTAGE GEAR TRANSMISSION SYSTEM

(71) Applicant: SUZUKI MOTOR CORPORATION, Hamamatsu-Shi, Shizuoka (JP)

(72) Inventor: Hideaki Takahashi, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 286 days.

(21) Appl. No.: 15/255,414

(22) Filed: Sep. 2, 2016

(65) Prior Publication Data

US 2017/0067542 A1 Mar. 9, 2017

(30) Foreign Application Priority Data

Sep. 4, 2015 (JP) .................. 2015-175102

(51) Int. Cl.
*F16H 3/30* (2006.01)
*F16H 63/18* (2006.01)
*F16H 63/32* (2006.01)
*F16H 3/12* (2006.01)

(52) U.S. Cl.
CPC .............. *F16H 3/12* (2013.01); *F16H 63/18* (2013.01); *F16H 63/32* (2013.01)

(58) Field of Classification Search
CPC . F16H 3/16; F16H 63/18; F16H 63/32; F16H 3/30

USPC ................................................. 74/335, 337.5
See application file for complete search history.

(56) References Cited

U.S. PATENT DOCUMENTS

| 8,037,779 B2 * | 10/2011 | Shiozaki ................. F16H 63/18 74/473.36 |
| 2008/0127766 A1 * | 6/2008 | Ogasawara ............ B60K 17/08 74/473.16 |
| 2010/0107796 A1 * | 5/2010 | Tomoda .................. F16H 63/18 74/473.1 |
| 2010/0251846 A1 * | 10/2010 | Pick ........................ F16H 61/32 74/473.12 |

FOREIGN PATENT DOCUMENTS

| JP | 2010260548 A | 11/2010 |
| JP | 2015010709 A | 1/2015 |

* cited by examiner

*Primary Examiner* — Ha Dinh Ho
(74) *Attorney, Agent, or Firm* — Troutman Sanders LLP

(57) ABSTRACT

A motor has a motor gear installed in a motor output shaft to rotate in synchronization. A gearshift actuation transmission mechanism has a gear shift cam-side actuator gear directly engaged with a gear shift cam to transmit rotation. The gear shift cam-side actuator gear meshes with the motor gear directly or indirectly by interposing another actuator gear to transmit the rotation from the motor to the gear shift cam.

10 Claims, 11 Drawing Sheets

F I G. 5
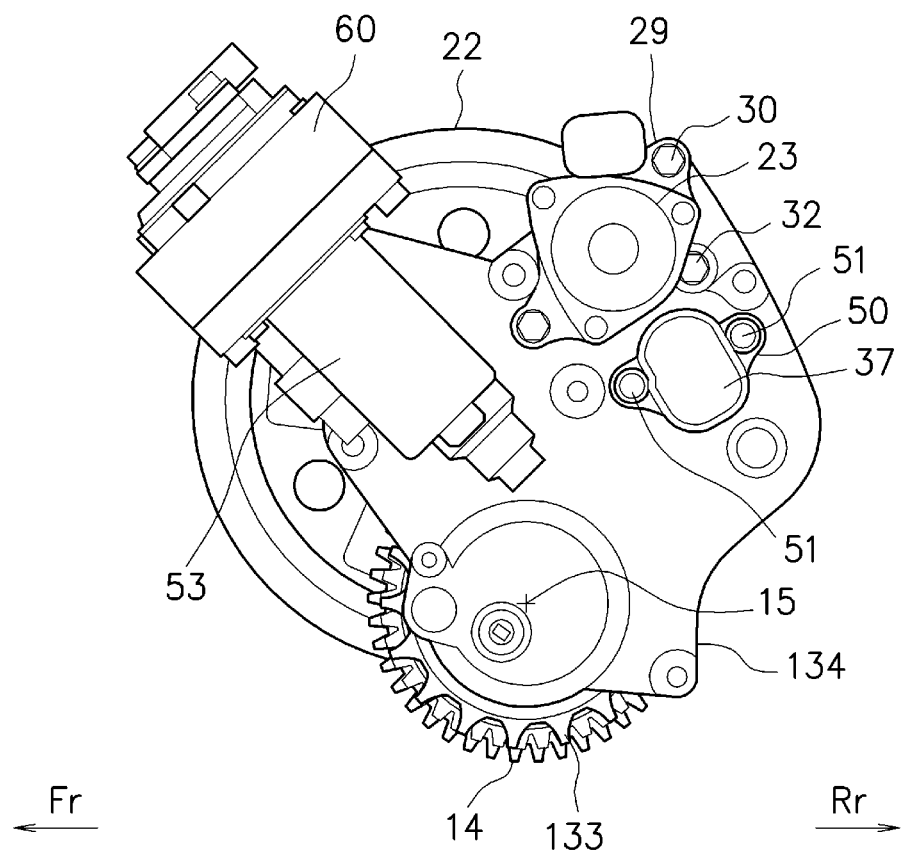

MULTISTAGE GEAR TRANSMISSION SYSTEM

CROSS-REFERENCE TO RELATED APPLICATIONS

This application is based upon and claims the benefit of priority of the prior Japanese Patent Application No. 2015-175102, filed on Sep. 4, 2015, the entire contents of which are incorporated herein by reference.

BACKGROUND OF THE INVENTION

Field of the Invention

The present invention relates to a multistage gear transmission system suitable for a speed-change gear unit of a saddle-ride type vehicle or automobile.

Description of the Related Art

As a speed-change gear unit for such a type of vehicles, an automated manual transmission (AMT) mechanism or a dual-clutch transmission (DCT) mechanism capable of providing both excellent mechanical efficiency of a manual transmission and convenience of an automatic transmission is increasingly employed.

As the AMT or DCT gearshift mechanism for a motorcycle, various types of structures for transmitting an actuating force from a motor to a shift cam have been proposed. For example, in the technique of Japanese Laid-open Patent Publication No. 2015-10709, the power of the motor is decelerated by an actuator gear and is transmitted to rotate a shift cam drive plate through a shift arm and pin fixed to rotate in synchronization with a shift shaft. In addition, a hook portion of the shift cam plate and a pin portion of the shift cam plate rotating in synchronization with the shift cam are engaged with each other, so that the gearshift operation is performed by rotating the shift cam. Further, the shift shaft is returned to a neutral position by a return spring.

Patent Document 1: Japanese Laid-open Patent Publication No. 2015-10709

Patent Document 2: Japanese Laid-open Patent Publication No. 2010-260548

However, in the structure of Japanese Laid-open Patent Publication No. 2015-10709, an actuator motor or an actuator gear is simply installed in a gearshift mechanism of a manual transmission of the prior art. Therefore, the number of components or the weight significantly increases compared to a manual gearshift mechanism of the prior art. Similarly, in the structure discussed in Japanese Laid-open Patent Publication No. 2010-260548, an actuator, a worm gear, a shift shaft, and a link mechanism for connecting the shift shaft and the actuator are installed in the manual gearshift mechanism of the prior art. For this reason, the structure becomes complicated. Therefore, the size of the motor inevitably increases due to degradation of mechanical efficiency in addition to an increase of the number of components or the weight.

SUMMARY OF THE INVENTION

In view of the aforementioned problems, it is therefore an object of the present invention to provide a multistage gear transmission system capable of facilitating a simplified structure and implementing high transmission efficiency.

According to an aspect of the present invention, there is provided a multistage gear transmission system including: a speed-change gear unit having a countershaft configured to receive rotation transmitted from an engine inside a gearbox, a plurality of driving gears configured to receive rotation from the countershaft, a plurality of driven gears meshing with the driving gears to receive the rotation, a driveshaft configured to externally transmit the rotation of the driven gears, a transmission member slidably provided in the countershaft and/or the driveshaft to transmit the rotation by meshing with the countershaft and a predetermined one of the driving gears and/or meshing with a predetermined one of the driven gears and the driveshaft, a shift fork shaft configured to hold, slidably in an axial direction, the shift fork provided to move the transmission member, and a gear shift cam configured to move the shift fork; a control unit configured to issue a gearshift execution command when a gearshift manipulation is received, and/or a predetermined condition set in advance is satisfied; and a gearshift actuator having a motor actuated in response to the gearshift execution command from the control unit to rotate the gear shift cam by a predetermined angle, and a gearshift actuation transmission mechanism configured to transmit actuation generated from the motor to the gear shift cam, wherein the motor is provided with a motor gear installed to rotate in synchronization with a motor output shaft, the gearshift actuation transmission mechanism is provided with a gear shift cam-side actuator gear directly engaged with the gear shift cam to transmit rotation, and the gear shift cam-side actuator gear meshes with the motor gear directly or indirectly by interposing another actuator gear to transmit the rotation from the motor to the gear shift cam.

The multistage gear transmission system described above may further include: a propulsion transmission component installed in an end of the driveshaft outside of the gearbox to rotate in synchronization and transmit rotation to a propulsion wheel; and a protection member installed outside of the gearbox to externally cover a part of the propulsion transmission component, wherein the gearshift actuation transmission mechanism is positioned inward in an axial direction of the driveshaft with respect to the protection member.

In the multistage gear transmission system described above, the gearshift actuation transmission mechanism may be assembled inward of the protection member in the axial direction.

In the multistage gear transmission system described above, the motor may be assembled in the protection member.

In the multistage gear transmission system described above, the gear shift cam-side actuator gear may be positioned in the gear shift cam side with respect to the propulsion transmission component in the axial direction of the driveshaft, the gearshift actuation transmission mechanism may have an actuator housing that holds the gear shift cam-side actuator gear, and an end surface of the gear shift cam side of the actuator housing may be positioned inward of an inner surface of the propulsion transmission component.

In the multistage gear transmission system described above, a part of the actuator housing in the gear shift cam side positioned inward of the propulsion transmission component may overlap with the propulsion transmission component as seen in the axial direction of the driveshaft.

The multistage gear transmission system described above may further include a shift cam sensor configured to detect a rotation angle of the gear shift cam and transmit a detection result to the control unit, wherein the shift cam sensor is provided on the gear shift cam shaft to rotate in synchronization by interposing the gear shift cam-side actuator gear.

In the multistage gear transmission system described above, the gear shift cam-side actuator gear may have a shaft portion that is coaxial with the gear shift cam and protrudes oppositely, an end of the shaft portion may be formed to protrude outward of an outer surface of the propulsion transmission component, and the shift cam sensor may be engaged with an end of the shaft portion of the gear shift cam-side actuator gear to rotate in synchronization and is positioned outward of the end of the shaft portion.

In the multistage gear transmission system described above, the shift cam sensor may have a sensor body portion configured to detect a rotation angle and a holder portion engaged with the shaft portion of the gear shift cam-side actuator gear to rotate in synchronization, the holder portion may be engaged with an end of the shaft portion of the gear shift cam-side actuator gear, and the sensor body portion may be combined with the holder portion to detect rotation of the holder portion.

In the multistage gear transmission system described above, a shaft portion-side end of the holder portion of the shift cam sensor may be formed to have a diameter smaller than that of a sensor body portion-side end of the holder portion.

In the multistage gear transmission system descried above, bearings that support both inner and outer sides of the gear shift cam-side actuator gear may be disposed separately inward and outward with respect to the propulsion transmission component.

BRIEF DESCRIPTION OF THE DRAWINGS

FIG. 5 is a left side view illustrating the speed-change gear unit according to an embodiment of the invention;

DETAILED DESCRIPTION OF THE PREFERRED EMBODIMENTS

A multistage gear transmission system according to preferred embodiments of the present invention will now be described with reference to the accompanying drawings.

Figure 1:
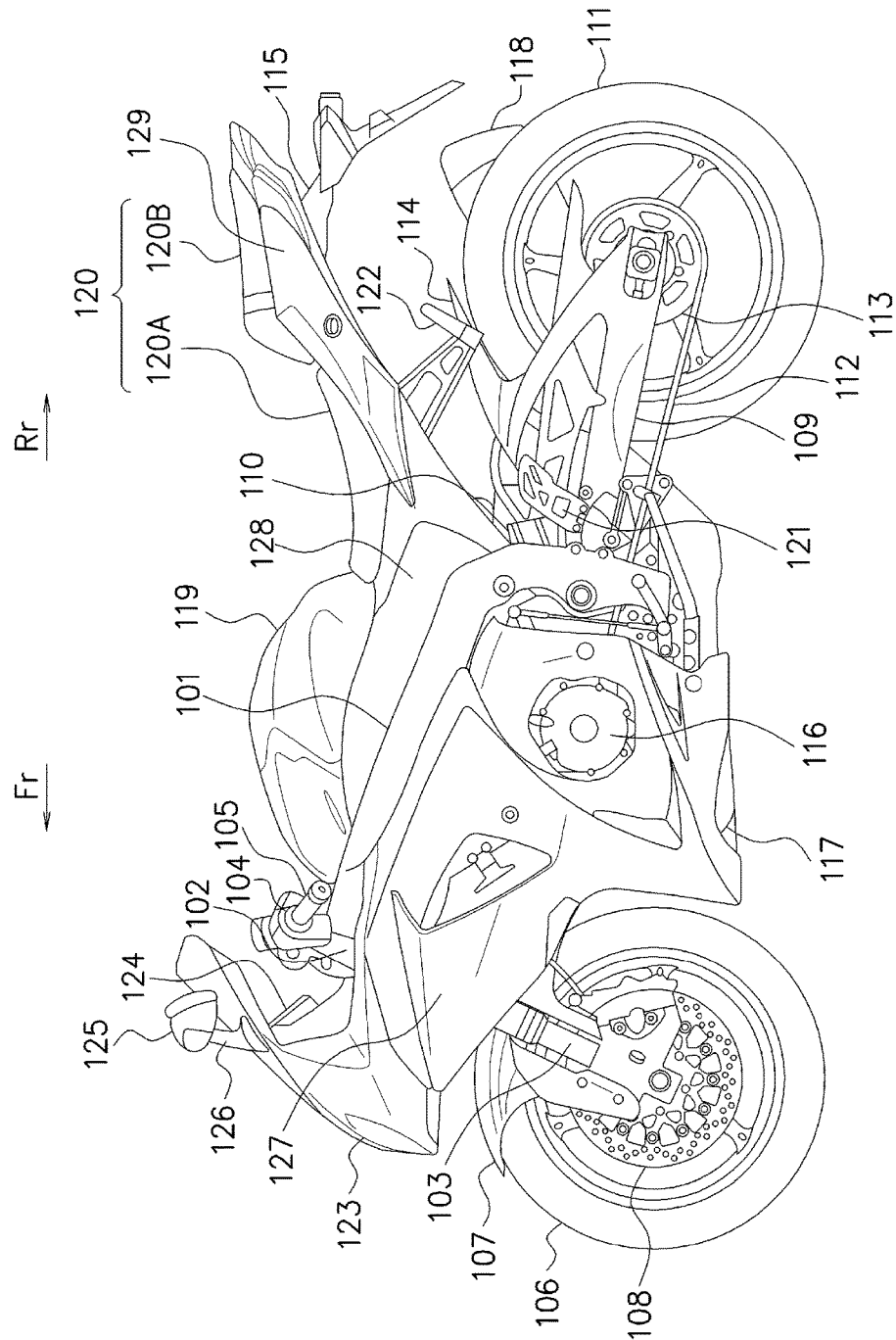
FIG. 1 is a side view illustrating a motorcycle according to an embodiment of the invention.

FIG. 1 is a side view illustrating a motorcycle 100 according to an application of the present invention. First, a configuration of the entire motorcycle 100 will be described with reference to FIG. 1. Note that, in the drawings including FIG. 1 used in following description, the arrow "Fr" denotes a front side of a vehicle, the arrow "Rr" denotes a rear side of the vehicle, the arrow "R" denotes a right side of the vehicle, and the arrow "L" denotes a left side of the vehicle as necessary.

Referring to FIG. 1, a pair of left and right front forks 103 supported by a steering head pipe 102 pivotably to the left or right are provided in a front part of a body frame 101 formed of steel or aluminum alloy. A handle bar 104 is fixed to the upper ends of the front forks 103, and grips 105 are provided in both ends of the handle bar 104. A front wheel 106 is rotatably supported in the lower parts of the front forks 103, and a front fender 107 is fixed to cover the upper part of the front wheel 106. The front wheel 106 is provided with a brake disk 108 rotating in synchronization with the front wheel 106.

The body frame 101 is connected to the rear part of the steering head pipe 102 and branches in a forked shape into a pair of left and right sides extending in a rearward-descending manner from the head pipe with a widening width. Further, seat rails extend from the vicinity of the rear part of the body frame 101 in a rearward-ascending manner at an appropriate inclination to support a seat described below. The body frame 101 and the seat rails constitute a chassis. A swing arm 109 is swingably combined in the rear part of the body frame 101, and a rear shock absorber 110 is suspended between the swing arm 109 and the body frame 101. A rear wheel 111 is rotatably supported in the rear end of the swing arm 109. The rear wheel 111 is rotated and driven by interposing a driven sprocket 113 where a chain 112 for transmitting the engine power is looped. An inner fender 114 that covers the vicinity of the upper front part of the rear wheel 111 is provided around the rear wheel 111, and a rear fender 115 is disposed over the inner fender 114.

The engine unit 116 mounted on the body frame 101 is supplied with a gas mixture from a fuel supply system (not shown) and discharges an exhaust gas combusted in the engine through an exhaust pipe 117. According to this embodiment, the engine may be, for example, a four-cycle multi-cylinder engine (typically, four-cylinder). The exhaust pipes 117 of each cylinder are combined beneath the engine unit 116, and the confluent exhaust gas is discharged from the exhaust system 118 to the outside through an exhaust chamber in the vicinity of the rear end of the vehicle.

A fuel tank 119 is mounted over the engine unit 116, and a seat 120 is installed consecutively at the rear of the fuel tank 119. That seat 120 includes a rider seat 120A and a tandem seat 120B. A footpeg 121 and a foot rest or pillion step 122 are disposed to match the rider seat 120A and the tandem seat 120B, respectively.

As illustrated in FIG. 1, a headlamp 123, an instrument unit 124 including a speedometer, a tachometer, and various indicator lamps, and a rearview mirror 125 supported by the handle bar 104 by connecting a stay 126 are further provided.

As a vehicle exterior member, a fairing 127 and a side cowling 128 primarily cover the front part and the side part of the vehicle. In addition, a side cover or a seat cowling 129 is attached to the rear part of the vehicle. These exterior members provide a so-called streamlined vehicle exterior form.

Figure 2:
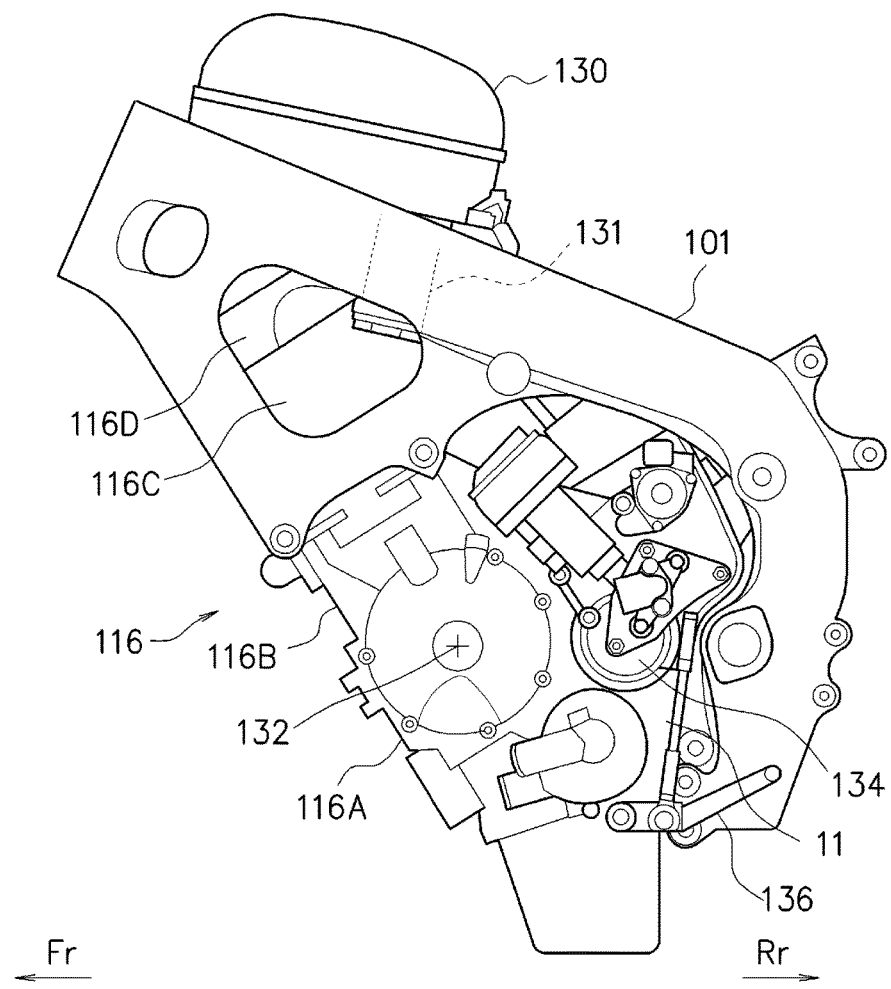
FIG. 2 is a side view illustrating an engine unit and its surroundings including a frame.
Figure 3:
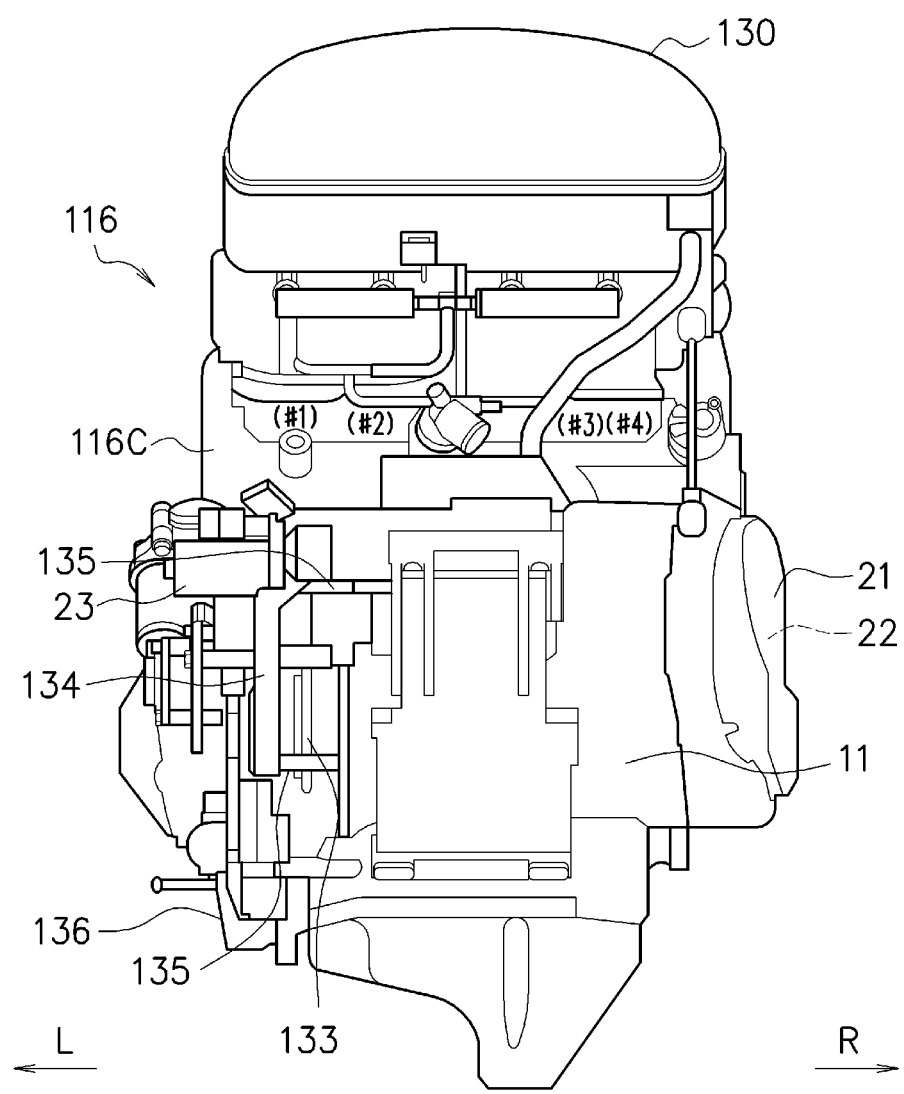
FIG. 3 is a rear view illustrating the engine unit according to an embodiment of the invention.

Here, FIGS. 2 and 3 generally illustrate the engine unit 116 and its surroundings. FIG. 2 is a left side view illustrating the engine unit 116, and FIG. 3 is a rear view illustrating the engine unit 116. Referring to FIGS. 2 and 3, according to this embodiment, the engine unit 116 includes a crankcase 116A, a cylinder block 116B, a cylinder head 116C, and a cylinder head cover 116D combined sequentially to the upside and integrally. In this example, four cylinder blocks 116B are arranged side by side in the left-right direction (vehicle width direction) as illustrated in FIG. 3, and pistons are inserted into the cylinder bores of each cylinder block 116B slidably along the axial direction of the cylinders. Note that the first cylinder (#1), the second cylinder (#2), the third cylinder (#3), and the fourth cylinder (#4) are sequentially numbered from the left to the right. The engine unit 116 is suspended from the body frame 101 using a plurality of engine mounts, so that it is supported integrally by the body frame 101 and naturally serves as a rigidity member of the body frame 101.

As illustrated in FIG. 1, a fuel tank 119 having a dome shape or a carapace shape is mounted and supported on the body frame 101 to entirely cover the upper side of the body frame 101. In addition, an air cleaner 130 for supplying an intake system with clean air is disposed over the cylinder head cover 116D of the engine unit 116. The air cleaner 130 is connected to the engine unit 116, in particular, the cylinder head 116C through a throttle body 131 of the intake system as illustrated in FIG. 2. The air cleaned by the air cleaner 130 is input to the intake system, and the fuel is supplied from the fuel supply system, so that a gas mixture mixed at a predetermined mixing ratio is fed to the intake port of the cylinder head 116C. An intake passage that connects the air cleaner 130 to an engine combustion chamber communicating with the intake port of the cylinder head 116C is provided with the throttle body 131 disposed in an approximately vertically erected manner. That is, in this example, the engine unit 116 has a downdraft type intake structure.

A gearbox 11 internally provided with a speed-change gear unit 10 as a multistage gear transmission system according to the present invention is integrated into a rear part of the crankcase 116A. The crankshaft 132 (FIG. 2) disposed inside the crankcase 116A and a sprocket 133 (refer to FIGS. 3 and 4) as a propulsion transmission component arranged in the left outer surface of the gearbox 11 are connected to each other by interposing the speed-change gear unit 10. That is, the engine output power of the engine unit 116 is transmitted to the sprocket 133 as an output destination through the speed-change gear unit 10. A chain 112 (FIG. 1) is looped between the sprocket 133 and the driven sprocket 113, so that the power of the engine unit 116 is transmitted to the rear wheel 111 by reducing the engine rotation speed at a desired gear ratio using the speed-change gear unit 10.

Figure 4:
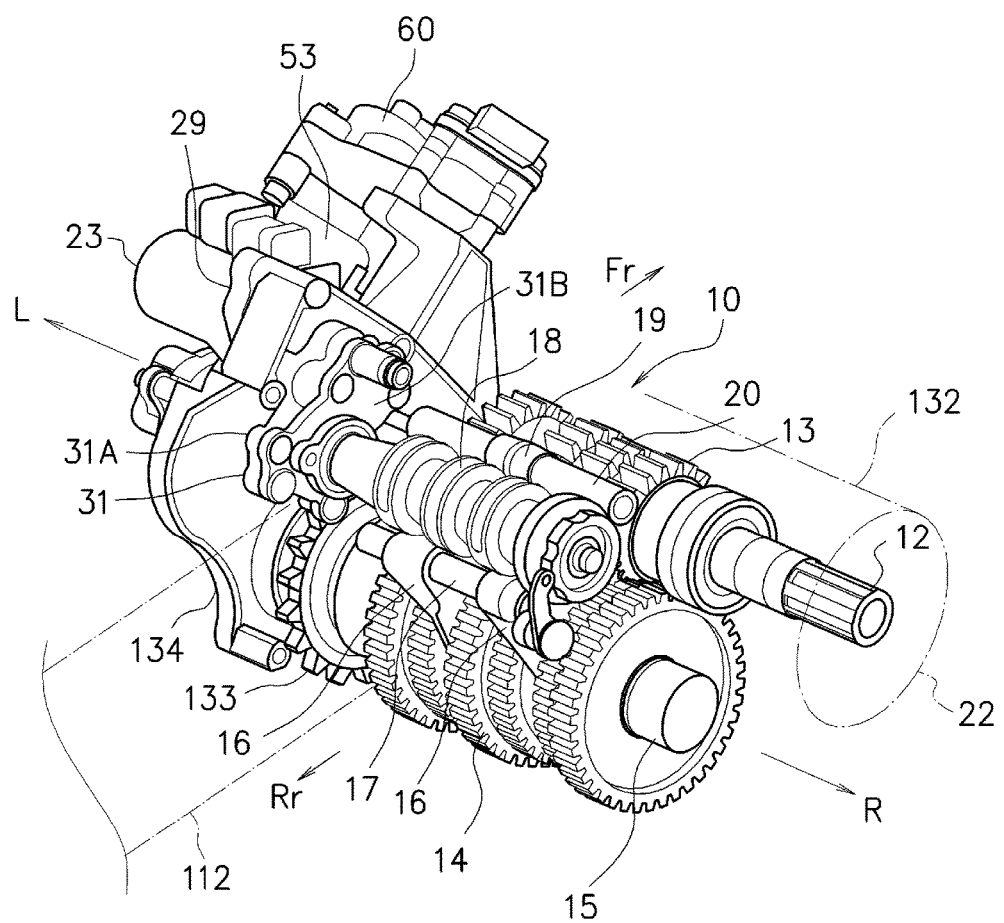
FIG. 4 is a perspective view illustrating a main configuration of a speed-change gear unit disposed inside a gearbox according to an embodiment of the invention.

FIGS. 4 and 5 illustrate a specific configuration example of the speed-change gear unit 10 according to this embodiment. FIG. 4 is a perspective view illustrating a main configuration of the speed-change gear unit 10 disposed inside the gearbox 11, and FIG. 5 is a left side view illustrating the speed-change gear unit 10. The speed-change gear unit 10 includes a countershaft 12 that receives rotation transmitted from the crankshaft 132 of the engine unit 116, a plurality of driving gears 13 (speed-change gears) that receive the rotation from the countershaft 12, a plurality of driven gears 14 (speed-change gears) that mesh with the driving gears 13 to receive the rotation, a driveshaft 15 that transmits the rotation of the driven gears 14 to the outside, a driveshaft-side transmission member (that is, a transmission dog, not shown in FIG. 4) slidably provided in the driveshaft 15 and engaged with a predetermined driven gear 14 and the driveshaft 15 to transmit the rotation, a shift fork 16 configured to move the transmission member, a shift fork shaft 17 configured to hold the shift fork 16 slidably in an axial direction, and a gear shift cam 18 arranged side by side in parallel with the driveshaft 15 and the shift fork shaft 17 and rotated to move the shift fork 16.

Note that the speed-change gear unit 10 includes a countershaft-side transmission member (transmission dog) slidably provided in the countershaft 12 and engaged with a predetermined driving gear 13 and the countershaft 12 to transmit the rotation, and a shift fork shaft 20 configured to axially slidably hold the shift fork 19 for moving the countershaft-side transmission member. The countershaft 12, the driveshaft 15, the shift fork shaft 17, and the shift fork shaft 20 are rotatably supported by the gearbox 11. In the speed-change gear unit 10, as the gear shift cam 18 is rotated and driven in response to a gearshift manipulation, the countershaft 12 and the driveshaft 15 are connected to each other by combining a desired speed-change gear set. That is, a desired gear ratio can be set in a multistage gear set.

Although not shown in the drawings, a clutch unit covered by a clutch covering 21 as illustrated in FIG. 3 is axially mounted in the right shaft end of the countershaft 12. By actuating the clutch unit 22, the power transmitted from the crankshaft 132 to the countershaft 12 is connected or disconnected. Note that the sprocket 133 is installed in an end of the driveshaft 15 (in this example, the left end) to rotate in synchronization outside the gearbox 11. Therefore, the sprocket 133 serves as a propulsion transmission component for transmitting the last stage rotation output power from the speed-change gear unit 10 to the rear wheel 111 as a propulsion wheel.

Figure 6:
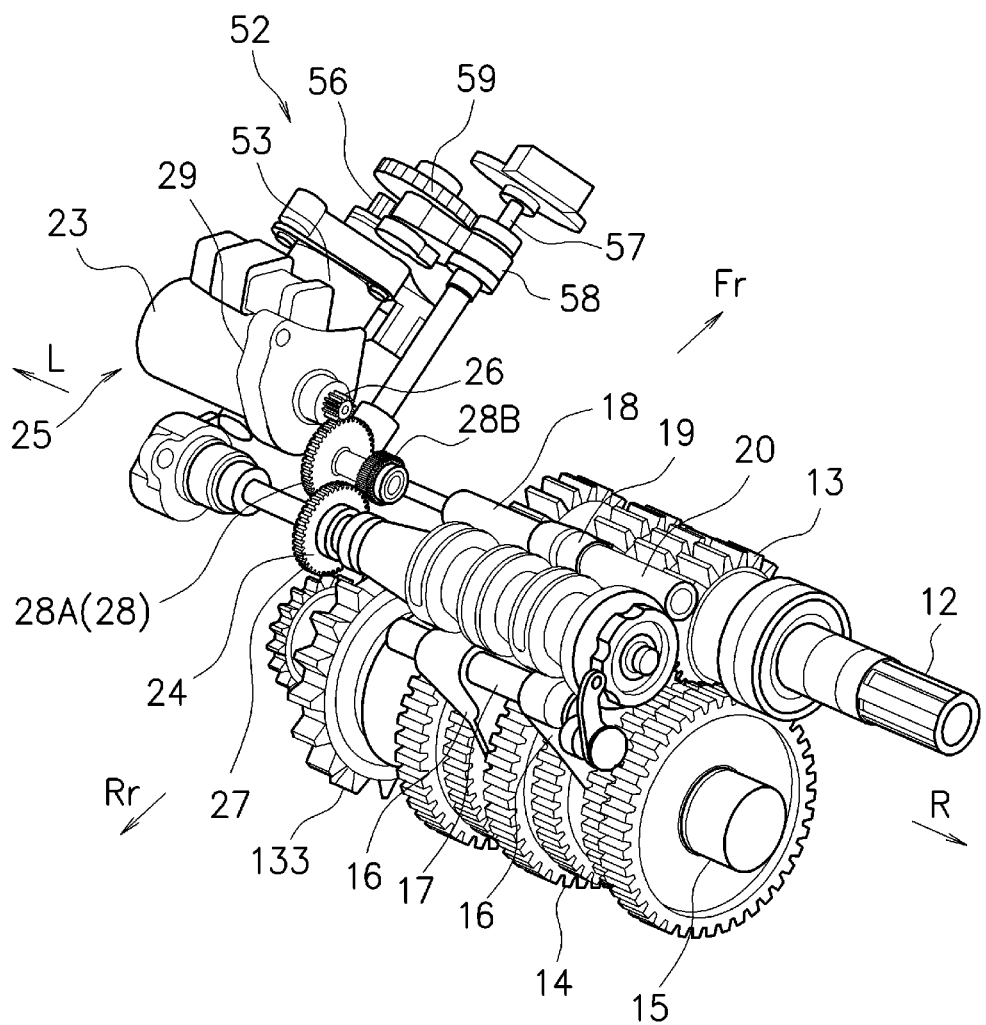
FIG. 6 is a perspective view illustrating a main configuration of the speed-change gear unit disposed in the gearbox according to an embodiment of the invention.

Referring to FIG. 6, the multistage gear transmission system according to the present invention further includes a motor 23 operated in response to a gearshift execution command from a control unit to serve as a driving source for rotating the gear shift cam 18 by a predetermined angle, and a gearshift actuator 25 provided with a gearshift actuation transmission mechanism 24 configured to transmit the actuation generated from the motor 23 to the gear shift cam 18. The motor 23 has a motor gear 26 installed to rotate in synchronization with the motor output shaft. In addition, the gearshift actuation transmission mechanism 24 has a gear shift cam-side actuator gear 27 directly engaged with the gear shift cam 18 to transmit the rotation. In this example, an idle gear 28 meshing with the motor gear 26 and the actuator gear 27 is interposed between the motor gear 26 and the actuator gear 27, so that the rotation from the motor 23 is decelerated using these gears and is transmitted to the gear shift cam 18. The idle gear 28 may include an idle gear 28A meshing with the motor gear 26 and an idle gear 28B meshing with the actuator gear 27, so that they are rotated coaxially in synchronization. These gears may be, for example, a spur gear. Alternatively, the gearshift actuation transmission mechanism 24 may not have the idle gear 28. That is, the motor gear 26 and the actuator gear 27 may directly mesh with each other.

In the case described above, the sprocket 133 (or the chain 112) serving as a propulsion transmission component that transmits the rotation to the rear wheel 111 outside the gearbox 11 is installed in the end of the driveshaft 15 to rotate in synchronization. In addition, as illustrated in FIG. 3 or 4, a sprocket cover 134 as a protection member that externally covers a part of the sprocket 133 is further provided. As illustrated in FIG. 4 or 5, the sprocket cover 134 has, for example, an extremely thin casing structure having a generally deformed polygonal shape. That is, a circumferential edge of the casing is bent inward to the right to form an opening. As illustrated in FIG. 3, the sprocket cover 134 is supported by the left side surface of the gearbox 11 with a certain gap using a plurality of guide pins in the vicinity of its circumferential edge. Further, the sprocket cover 134 may be fixed to the guide pins 135 by fastening a bolt. As recognized from FIG. 4 or 5, the sprocket cover 134 is disposed to externally cover the sprocket 133 and overlap with (nearly) most of the main components of the speed-change gear unit 10 arranged inside the gearbox 11 as seen in a side view. In addition, the gearshift actuation transmission mechanism 24 is positioned inward in an axial direction of the driveshaft 15 with respect to the sprocket cover 134, that is, in this example, in the right side.

The motor 23 is assembled in the sprocket cover 134 and is supported thereby. As illustrated in FIGS. 4 and 5, the motor 23 has a flange 29 in the motor gear 26 side. In addition, this flange 29 is attached to the sprocket cover 134 by fastening a plurality of bolts 30, so that the motor 23 can be fixed to the sprocket cover 134.

Figure 7:
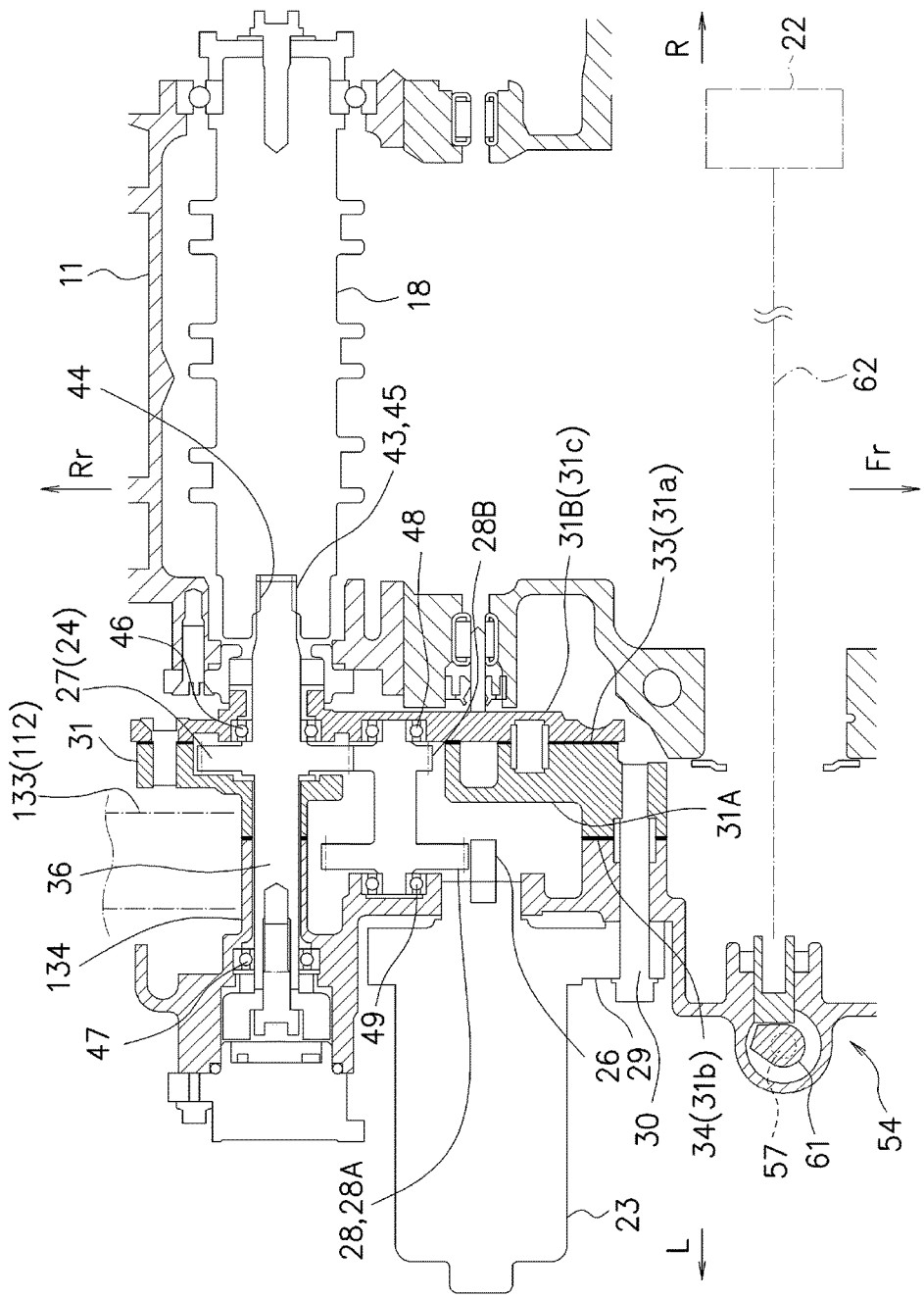
FIG. 7 is a cross-sectional view illustrating a gearshift actuation transmission mechanism and its surroundings according to an embodiment of the invention as seen from the bottom.

The gear shift cam-side actuator gear 27 is positioned in the gear shift cam 18 side with respect to the sprocket 133 in the axial direction of the driveshaft 15. In addition, as illustrated in FIG. 4, the gearshift actuation transmission mechanism 24 has an actuator housing 31 that holds at least the actuator gear 27. According to this embodiment, all of the actuator gear 27, the motor gear 26, and the idle gear 28 (including the idle gears 28A and 28B) are housed and held inside the actuator housing 31. The actuator housing 31 is disposed in the right inner side of the sprocket cover 134 as illustrated in FIG. 4 and is formed by overlappingly combining the outer half 31A and the inner half 31B in the left-right direction as illustrated in FIG. 7. Note that FIG. 7 is a cross-sectional view taken along the axial line of the gear shift cam 18, the motor 23, or the actuator gear 27 as the gearshift actuation transmission mechanism 24 and its surroundings are seen generally from the bottom. The actuator housing 31 may be attached to the sprocket cover 134 by fastening a plurality of bolts 32 (refer to FIG. 5).

Figure 8:
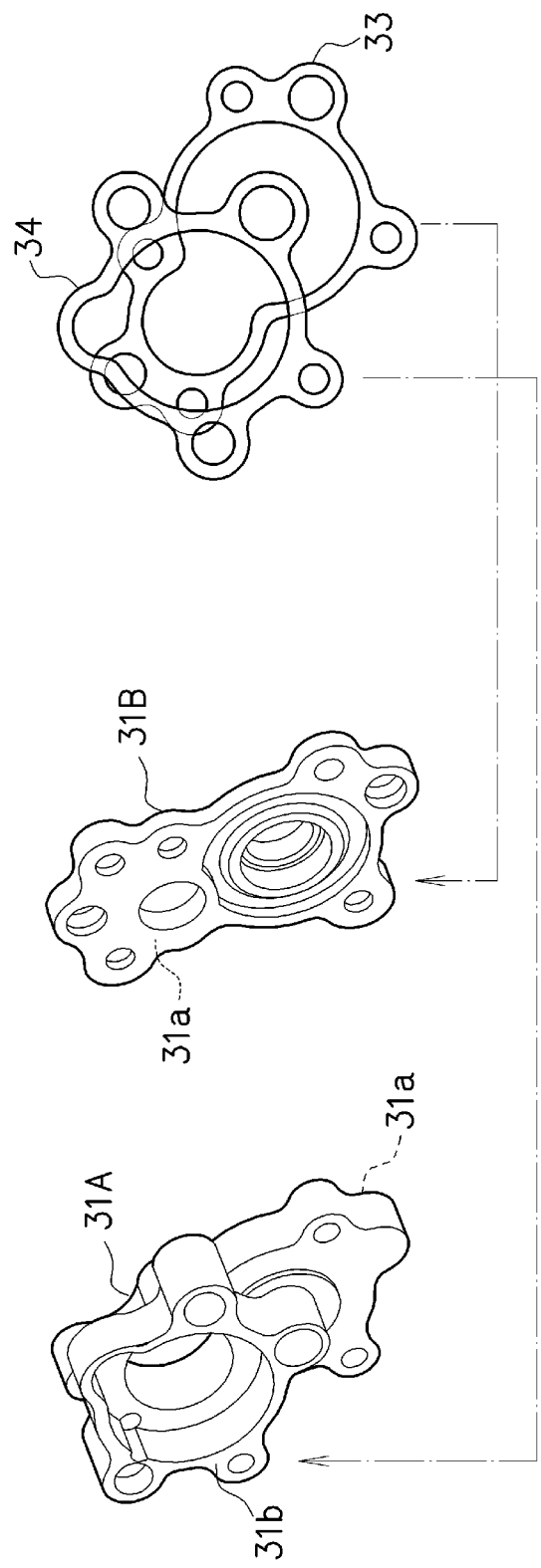
FIG. 8 is a perspective view illustrating an actuator housing and a seal member thereof according to an embodiment of the invention.

Here, as illustrated in FIGS. 7 and 8, the outer and inner halves 31A and 31B of the actuator housing are combined by interposing a mating surface 31a set in a coplanar manner. A seal member 33 is nipped on the mating surface 31a between the outer and inner halves 31A and 31B to obtain air tightness and liquid tightness of the internal space of the actuator housing 31. In addition, the outer half 31A is combined with the sprocket cover 134 by interposing a mating surface 31b opposite to the mating surface 31a. A seal member 34 is nipped on the mating surface 31b between the outer half 31A and the sprocket cover 134.

As illustrated in FIG. 7, the actuator housing 31 has an end surface 31c in the gear shift cam 18 side inward (in the right side) of the inner surface of the sprocket 133 as a propulsion transmission component. In this case, the end surface 31c is set as the inner half 31B.

Figure 9:
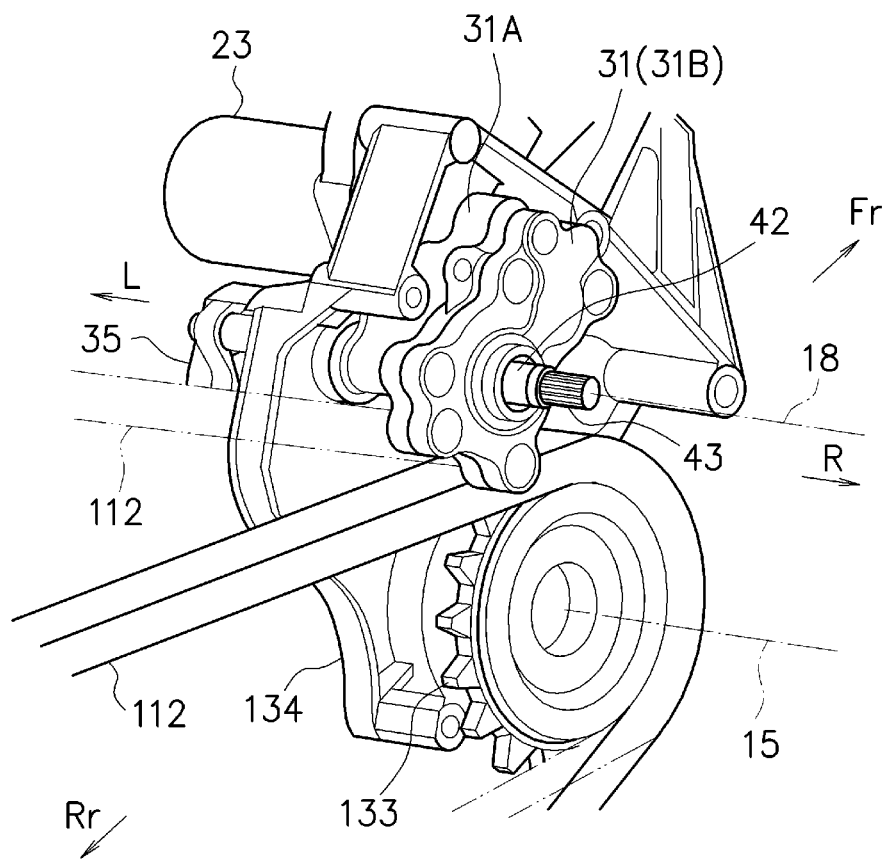
FIG. 9 is a perspective view illustrating the actuator housing disposed inside a propulsion transmission component and its surroundings according to an embodiment of the invention.

Referring to FIG. 9, a part of the gear shift cam 18 side of the actuator housing 31 inward of the sprocket 133 overlaps with the chain 112 as a propulsion transmission component as seen in an axial direction of the driveshaft 15. While the swing arm 109 swings during a travel of the motorcycle 100, the chain 112 also vertically swings to follow the swing arm 109 as indicated by the solid line and the two-dotted chain line of FIG. 9. When the chain 112 is vibrated upward as indicated by the two-dotted chain line in FIG. 9, a part of the actuator housing 31 (in the vicinity of the lower part) overlaps with the chain 112 as seen in the axial direction of the driveshaft 15.

As illustrated in FIG. 6, the multistage gear transmission system according to the present invention further has a shift cam sensor 35 configured to detect a rotation angle of the gear shift cam 18 and transmit a detection signal thereof to the control unit. The shift cam sensor 35 is provided on the shaft of the gear shift cam 18 to rotate in synchronization by interposing the actuator gear 27.

Figure 10A:
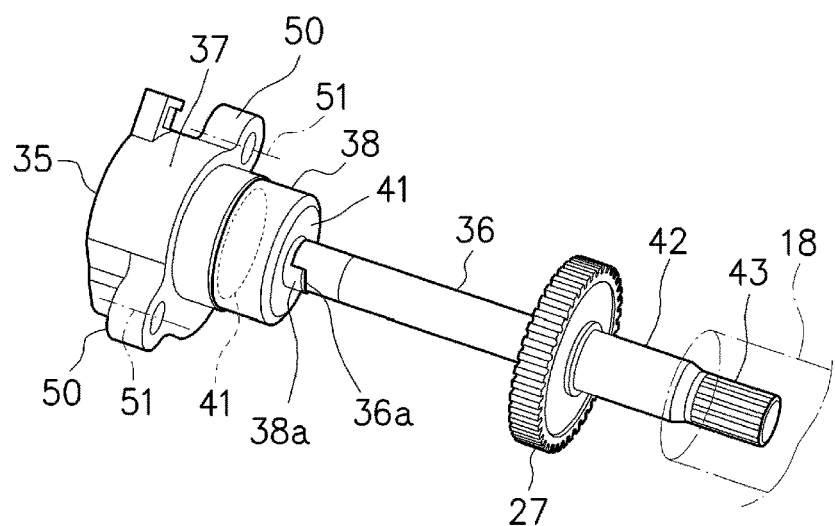
FIG. 10A is a perspective view illustrating a link structure between an actuator gear and a shift cam sensor according to an embodiment of the invention.

As illustrated in FIGS. 7 and 10A, the actuator gear 27 has a shaft portion 36 that is coaxial with the gear shift cam 18 and protrudes to the opposite side. The end of the shaft portion 36 is formed to protrude outward (to the left side) of the outer surface of the sprocket 133 (or the chain 112) as illustrated in FIG. 7.

The shift cam sensor 35 is engaged with an end of the shaft portion 36 of the actuator gear 27 to rotate in synchronization and is positioned in the outer side (the left side).

Figure 10B:
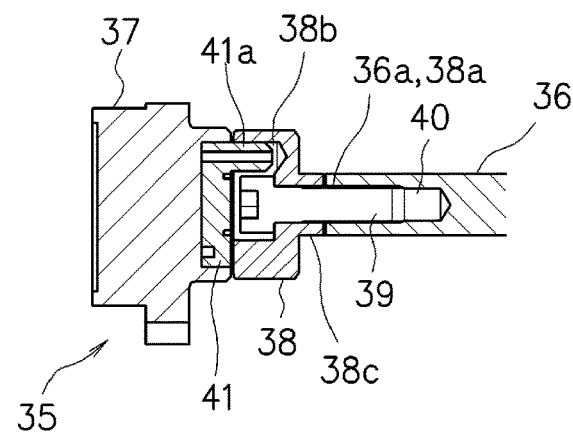
FIG. 10B is a cross-sectional view illustrating the link structure between the actuator gear and the shift cam sensor according to an embodiment of the invention.

As illustrated in FIGS. 10A and 10B, the shift cam sensor 35 includes a sensor body portion 37 configured to detect a rotation angle of the gear shift cam 18 and a holder portion 38 engaged with the shaft portion 36 of the actuator gear 27 to rotate in synchronization. As illustrated in FIG. 10B, while an end of the holder portion 38 abuts on an end of the shaft portion 36, a bolt 39 inserted to the inside of the holder portion 38 is screwed to a thread (female screw) formed in a hole 40 of the shaft portion 36, so that the holder portion 38 and the shaft portion 36 are fastened to each other. In this case, a convex portion 38a is provided in the end of the holder portion 38, and a concave portion 36a engaged with the convex portion 38a is provided in the end of the shaft portion 36, so that the convex and concave portions 38a and 36a are engaged with each other. By virtue of the engagement between the convex portion 38a and the concave portion 36a, the holder portion 38 and the shaft portion 36 are combined to rotate in synchronization.

Since the sensor body portion 37 is combined with the holder portion 38, the rotation of the holder portion 38 is detected. In this case, as illustrated in FIG. 10B, the sensor body portion 37 has a rotator 41 disposed coaxially with the holder portion 38 and the shaft portion 36 and mounted rotatably inside. A protrusion 41a protruding toward the holder portion 38 is provided in the vicinity of the outer circumference of the rotator 41, and the holder portion 38 has a hollowed portion 38b where the protrusion 41a is inserted. Further, the actuator gear 27 has an extension 42 coaxially protruding toward the gear shift cam 18 as illustrated in FIGS. 7 and 10A. A spline 43 formed in the tip of the extension 42 (FIG. 10A) is engaged with a spline 45 formed in an inner hole 44 of the gear shift cam 18 (refer to FIG. 7). As the shaft portion 36 is rotated, the rotator 41 is rotated by the protrusion 41a and the hollowed portion 38b fitted to each other. The sensor body portion 37 can detect a rotation amount of the rotator 41. That is, the shift cam sensor 35 can detect a rotation angle of the gear shift cam 18.

As illustrated in FIG. 10B, in the shift cam sensor 35, an end 38c of the shaft portion 36 side of the holder portion 38 has a diameter smaller than that of the other end of the sensor body portion 37 side. That is, the end 38c of the holder portion 38 provided with the convex portion 38a is formed in a stepped shape to substantially match the diameter of the shaft portion 36.

As illustrated in FIG. 7, the actuator gear 27 is rotatably supported by a pair of bearings 46 and 47 installed in both inner and outer sides. The bearings 46 and 47 are disposed separately inward and outward with respect to the sprocket 133 (or the chain 112) as a propulsion transmission component. Note that the idle gear 28 (including the idle gears 28A and 28B) is rotatably supported by a pair of bearings 48 and 49 in both inner and outer sides as illustrated in FIG. 7.

In the case described above, as illustrated in FIG. 5 and the like, the sensor body portion 37 is provided with a flange 50 (refer to FIG. 10A) in the sprocket cover 134 side. In addition, by attaching this flange 50 to the sprocket cover 134 by fastening a plurality of bolts 51, the sensor body portion 37 can be fixed in the outer side (the left side) of the sprocket cover 134.

Returning to FIG. 6, the multistage gear transmission system according to the present invention further has a clutch release actuator 52 provided with a motor 53 actuated in response to a clutch release execution command from the control unit to serve as a driving source for connecting or disconnecting the clutch unit 22 and a clutch release actuation transmission mechanism 55 configured to transmit the actuation generated from the motor 53 to the clutch release mechanism 54 (refer to FIG. 7). An output shaft of the motor 53 is provided with a motor gear 56 installed to rotate in synchronization. In addition, the clutch release actuation transmission mechanism 55 has an actuator gear 58 configured to transmit the rotation to the cam shaft 57 of the clutch release mechanism 54. In this example, an idle gear 59 meshing with the motor gear 56 and the actuator gear 58 is interposed between the motor gear 56 and the actuator gear 58, and the rotation from the motor 53 is decelerated by these gears and is transmitted to the cam shaft 57. Note that the motor gear 56, the actuator gear 58, and the idle gear 59 are disposed inside the actuator housing 60 (refer to FIG. 11), and the motor 53 is assembled in the actuator housing 60 and is supported thereby.

Here, as illustrate in FIG. 7, the clutch release mechanism 54 has a cam 61 fixed to the tip (lower end) of the cam shaft 57 and a push rod 62 inserted into the hollow of the countershaft 12 slidably in its axial direction. The push rod 62 is biased by the cam 61 to advance or recede with respect to the pressure plate of the clutch unit 22. As the motor 53 is actuated in response to the clutch release execution command from the control unit, the pressure plate is displaced by the clutch release mechanism 54 using the push rod 62 resisting to the resilience of the clutch spring. As a result, frictional engagement between the driving and driven plates of the clutch unit 22 is released, so that the clutch has a disconnected state.

Figure 11:
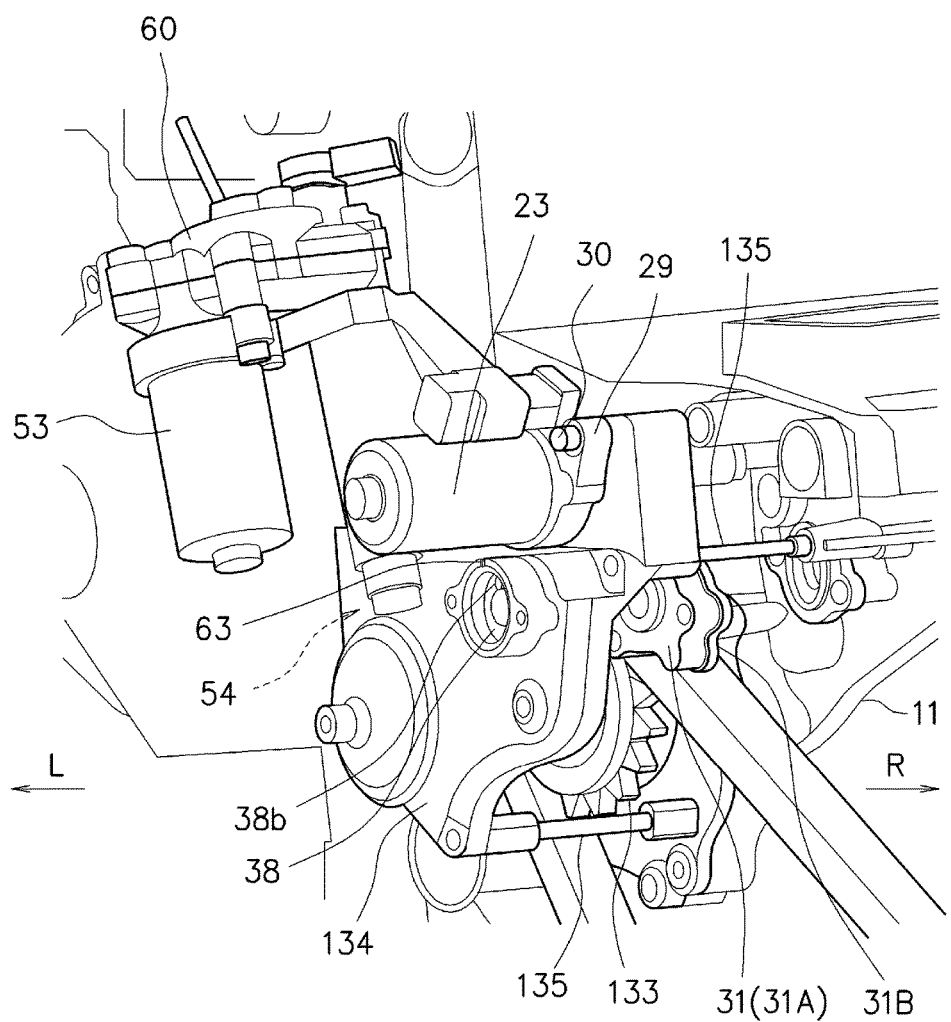
FIG. 11 is a perspective view illustrating an actuator mechanism and its surroundings according to an embodiment of the invention.

Note that, while the shift cam sensor 35 is installed in the sprocket cover 134, a positioning mark 63 for matching the hollowed portion 38b of the holder portion 38 and the actuator-side member is formed on the sprocket cover 134 as illustrated in FIG. 11. Using this mark 63, the shift cam sensor 35 can be installed in or uninstalled from the gearbox 11 while it is assembled integrally in advance. Therefore, it is possible to improve maintainability. In addition, a sensor output value of the shift cam sensor 35 in a predetermined gear position (for example, a neutral position) can be easily adjusted to a prescribed value.

In the operation of the speed-change gear unit 10 of the multistage gear transmission system according to the present invention, the driving of the motor 23 is controlled by the control unit. However, as a source for generating a driving signal thereof, for example, a gearshift pedal 136 pivotally supported in the lower left outer side of the engine unit 116 may be manipulated as illustrated in FIG. 2 or 3. In this case, the gearshift pedal 136 may not be mechanically connected to the speed-change gear unit 10, and the control unit controls the driving of the motor 23 on the basis of an electric signal in response to a gearshift manipulation of the gearshift pedal 136. In addition, as a clutch manipulation for the clutch unit 22, for example, a clutch lever installed in the handle bar 104 may be used to make the clutch manipulation. The control unit may control the driving of the motor 53 on the basis of an electric signal in response to the clutch manipulation of the clutch lever. Alternatively, as a source for generating the driving signal for the motor 23 or 53, a separate control switch may be installed in the vehicle, so that the driving of the motor 23 or 53 is controlled by the control unit on the basis of a signal generated by manipulating the control switch.

Alternatively, the control unit may issue a gearshift execution command to the motor 23 when a predetermined condition set in advance is satisfied.

In the multistage gear transmission system according to the present invention, the motor 23 is driven by the control unit in response to a gearshift manipulation, and the gear shift cam 18 is rotated and driven using the gearshift actuation transmission mechanism 24. As the gear shift cam 18 is rotated, the countershaft 12 and the driveshaft 15 can be connected to each other through a desired speed-change gear set. That is, a desired gear ratio can be set in a multistage gear set.

According to the present invention, in the speed-change gear unit 10, the motor 23 and the gear shift cam 18 are connected to each other through the motor gear 26, the actuator gear 27, and the idle gear 28. In addition, the rotation amount of the gear shift cam 18 can be accurately and minutely controlled by controlling the rotation of the motor 23. Compared to a structure of the prior art in which the driving plate swings as the gear shift cam is rotated, the structure according to the present invention is simple without a necessity of the driving plate or the biasing return spring. For this reason, it is possible to reduce an unnecessary load on the motor 23 and efficiently operate the motor 23. As a result, compared to the technique of the prior art, a smaller motor can be employed. In addition, it is possible to reduce the number of gears such as the actuator gear 27 used in deceleration or the diameter of the gear such as the actuator gear 27. In this case, an acceleration factor corresponding to a lever ratio in a portion for driving the shift cam plate using the driving plate is eliminated. Therefore, there is no need to increase the deceleration ratio of the actuator gear 27. That is, the number of gear stages used in deceleration of the actuator gear 27 can be reduced, for example, from three to two stages. Therefore, it is possible to reduce the number of gears used for this purpose. Furthermore, since the number of components for actuating the speed-change gear unit 10 can be reduced, it is possible to achieve weight reduction and noise reduction.

The gearshift actuation transmission mechanism 24 is positioned inward of the sprocket cover 134 in the axial direction of the driveshaft 15.

It is possible to dispose the gearshift actuation transmission mechanism 24 by effectively using the space surrounding the sprocket 133 formed in the inner side of the sprocket cover 134 provided to protect the end of the driveshaft 15 protruding outward of the gearbox 11 or the propulsion transmission component such as the sprocket 133 and the chain 112. In addition, since the actuator gear 27 and the sprocket 133 can be covered by a single member, it is possible to obtain a simple structure and reduce an operation noise of the actuator gear 27 during the gearshift operation. Furthermore, since the protrusion on the outer surface is reduced, it is possible to smooth and satisfactory appearance.

The gearshift actuation transmission mechanism 24 is assembled in the inner side of the sprocket cover 134 in the axial direction.

If the gearshift actuation transmission mechanism 24 is installable in the sprocket cover 134 in this manner, it is possible to install or uninstall the actuator gear 27 in or from the gear box 11 while the actuator gear 27 is assembled integrally in advance. Therefore, it is possible to improve maintainability.

The motor 23 is assembled in the sprocket cover 134.

If the motor 23 is also installable in the sprocket cover 134 in this manner, it is possible to install or uninstall the gearshift actuator gear 27 in or from the gearbox 11 while the actuator gear 27 is assembled in advance. Therefore, it is possible to further improve maintainability.

The end surface of the gear shift cam 18 side of the actuator housing 31 is positioned inward of the inner surface of the sprocket 133 or the like.

By disposing the actuator housing 31 in this manner, it is possible to effectively use the space around the sprocket 133 and effectively implement miniaturization and weight reduction.

A part of the actuator housing 31 in the gear shift cam 18 side is provided to overlap with the chain 112 as seen in the axial direction of the driveshaft 15.

By disposing the part of the actuator housing 31 in the gear shift cam 18 side to overlap with the chain 112 as a propulsion transmission component, the actuator gear 27 in the gear shift cam 18 side can be disposed very closely to the driveshaft 15. Therefore, it is possible to shorten an inter-axial distance between the gear shift cam 18 and the driveshaft 15 and compactly form the speed-change gear unit 10.

The shift cam sensor 35 is provided to rotate in synchronization with the gear shift cam 18 by interposing the actuator gear 27 on the shaft of the gear shift cam 18.

By disposing the shift cam sensor 35 on the shaft of the gear shift cam 18 in this manner, it is possible to remove an unnecessary shaft and simplify the structure.

The shift cam sensor 35 is engaged with the end of the shaft portion 36 of the actuator gear 27 to rotate in synchronization and is positioned outside of the actuator gear 27.

By disposing the sensor body portion 37 outside of the propulsion transmission component such as the sprocket 133 and the chain 112 in this manner, it is possible to position the shaft portion 36 of the actuator gear 27 in the vicinity of the propulsion transmission component. As a result, it is possible to shorten the inter-axial distance between the gear shift cam 18 and the driveshaft 15 and compactly form the speed-change gear unit 10. In addition, since the shift cam sensor 35 is separated from the gearbox 11, it is possible to reduce influence of heat. Therefore, it is possible to guarantee a suitable operation of the shift cam sensor 35.

The holder portion 38 is engaged with the end of the shaft portion 36 of the actuator gear 27, and the sensor body portion 37 is combined with the holder portion 38 to detect rotation of the holder portion 38.

By dividingly configuring the shift cam sensor 35 in this manner, it is possible to allow the sensor body portion 37 to have versatility.

In the shift cam sensor 35, the end of the shaft portion 36 side of the holder portion 38 is formed to have a diameter smaller than that of the end of the sensor body portion 37 side.

Since the shift cam sensor 35 is formed in a dividing manner, and the holding portion 38 as a separate component has a smaller diameter, it is possible to reduce a diameter of the shaft portion 36 of the actuator gear 27 as a detection destination. In addition, by disposing the shaft portion 36 in the vicinity of the propulsion transmission component, it is possible to further shorten the inter-axial distance between the gear shift cam 18 and the driveshaft 15. Therefore, it is possible to compactly form the speed-change gear unit 10.

The bearings 46 and 47 that support both inner and outer sides of the actuator gear 27 are disposed separately inward and outward with respect to the propulsion transmission component.

The bearing 47 outward of the actuator gear 27 is disposed far from the outer side of the actuator gear 27, and the propulsion transmission component is disposed inward of the outer bearing 47. As a result, it is possible to shorten the inter-axial distance between the gear shift cam 18 and the driveshaft 15 and compactify the speed-change gear unit 10. Furthermore, the driveshaft 15 that holds the sprocket 133 (in which its end is not supported) does not excessively protrude outward of the gearbox 11, and a bending moment applied from the propulsion transmission component to the driveshaft 15 can be reduced. This is advantageous in terms of strength.

While preferred embodiments of the invention have been described and illustrated hereinbefore, it should be understood that they are only for exemplary purposes and are not to be construed as limitations. Any addition, omission, substitution, or modification may be possible without departing from the spirit or scope of the present invention.

The engine unit 116 having four cylinders according to the embodiments described above may be similarly applied to a multi-cylinder engine.

Although a speed-change gear unit of a saddle-ride type vehicle has been described in the embodiments described above by way of example, the embodiments described above may also be applied to other types of vehicles or watercraft.

According to the present invention, since the power transmission from the motor is performed using gearing, it is possible to simplify a mechanism and implement highly efficient power transmission.

What is claimed is:

1. A multistage gear transmission system comprising:
   a speed-change gear unit having
      a countershaft configured to receive rotation transmitted from an engine inside a gearbox,
      a plurality of driving gears configured to receive rotation from the countershaft,
      a plurality of driven gears meshing with the driving gears to receive the rotation,
      a driveshaft configured to externally transmit the rotation of the driven gears,
      a transmission member slidably provided in the countershaft and/or the driveshaft to transmit the rotation by meshing with the countershaft and a predetermined one of the driving gears and/or meshing with a predetermined one of the driven gears and the driveshaft,
      a shift fork shaft configured to hold, slidably in an axial direction, the shift fork provided to move the transmission member, and
      a gear shift cam configured to move the shift fork;
   a control unit configured to issue a gearshift execution command when a gearshift manipulation is received, and/or a predetermined condition set in advance is satisfied;

a gearshift actuator having
- a motor actuated in response to the gearshift execution command from the control unit to rotate the gear shift cam by a predetermined angle, and
- a gearshift actuation transmission mechanism configured to transmit actuation generated from the motor to the gear shift cam,
- wherein the motor is provided with a motor gear installed to rotate in synchronization with a motor output shaft,
- the gearshift actuation transmission mechanism is provided with a gear shift cam-side actuator gear directly engaged with the gear shift cam to transmit rotation,
- the gear shift cam-side actuator gear meshes with the motor gear directly or indirectly by interposing another actuator gear to transmit the rotation from the motor to the gear shift cam;

a propulsion transmission component installed in an end of the driveshaft outside of the gearbox to rotate in synchronization and transmit rotation to a propulsion wheel; and a protection member installed outside of the gearbox to externally cover a part of the propulsion transmission component, wherein the gearshift actuation transmission mechanism is positioned inward in an axial direction of the driveshaft with respect to the protection member.

2. The multistage gear transmission system according to claim 1, wherein the gearshift actuation transmission mechanism is assembled inward of the protection member in the axial direction.

3. The multistage gear transmission system according to claim 1, wherein the motor is assembled in the protection member.

4. The multistage gear transmission system according to claim 1, wherein the gear shift cam-side actuator gear is positioned in the gear shift cam side with respect to the propulsion transmission component in the axial direction of the driveshaft,
- the gearshift actuation transmission mechanism has an actuator housing that holds the gear shift cam-side actuator gear, and
- an end surface of the gear shift cam side of the actuator housing is positioned inward of an inner surface of the propulsion transmission component.

5. The multistage gear transmission system according to claim 4, wherein a part of the actuator housing in the gear shift cam side positioned inward of the propulsion transmission component overlaps with the propulsion transmission component as seen in the axial direction of the driveshaft.

6. The multistage gear transmission system according claim 1, further comprising a shift cam sensor configured to detect a rotation angle of the gear shift cam and transmit a detection result to the control unit,
- wherein the shift cam sensor is provided on the gear shift cam shaft to rotate in synchronization by interposing the gear shift cam-side actuator gear.

7. The multistage gear transmission system according to claim 6, wherein the gear shift cam-side actuator gear has a shaft portion that is coaxial with the gear shift cam and protrudes oppositely,
- an end of the shaft portion is formed to protrude outward of an outer surface of the propulsion transmission component, and
- the shift cam sensor is engaged with an end of the shaft portion of the gear shift cam-side actuator gear to rotate in synchronization and is positioned outward of the end of the shaft portion.

8. The multistage gear transmission system according to claim 7, wherein the shift cam sensor has a sensor body portion configured to detect a rotation angle and a holder portion engaged with the shaft portion of the gear shift cam-side actuator gear to rotate in synchronization,
- the holder portion is engaged with an end of the shaft portion of the gear shift cam-side actuator gear, and
- the sensor body portion is combined with the holder portion to detect rotation of the holder portion.

9. The multistage gear transmission system according to claim 8, wherein a shaft portion-side end of the holder portion of the shift cam sensor is formed to have a diameter smaller than that of a sensor body portion-side end of the holder portion.

10. The multistage gear transmission system according to claim 1, wherein bearings that support both inner and outer sides of the gear shift cam-side actuator gear are disposed separately inward and outward with respect to the propulsion transmission component.

* * * * *